United States Patent
Bauman et al.

(10) Patent No.: US 10,631,476 B2
(45) Date of Patent: *Apr. 28, 2020

(54) PROXIMITY PROGRAMMED, GLOBALLY SYNCHRONIZED IRRIGATION CONTROLLER AND SYSTEM

(71) Applicant: Nelson Irrigation Corporation, Walla Walla, WA (US)

(72) Inventors: Mark A. Bauman, Walla Walla, WA (US); Graham L. Hutchinson, Walla Walla, WA (US); Travis A. Griggs, Walla Walla, WA (US); Meade M. Neal, Walla Walla, WA (US)

(73) Assignee: Nelson Irrigation Corporation, Walla Walla, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/231,285

(22) Filed: Dec. 21, 2018

(65) Prior Publication Data

US 2019/0141918 A1 May 16, 2019

Related U.S. Application Data

(63) Continuation of application No. 14/882,253, filed on Oct. 13, 2015, now Pat. No. 10,194,598.

(Continued)

(51) Int. Cl.
*A01G 25/16* (2006.01)
*G05B 15/02* (2006.01)

(52) U.S. Cl.
CPC ............. *A01G 25/16* (2013.01); *G05B 15/02* (2013.01); *Y02A 40/238* (2018.01)

(58) Field of Classification Search
None
See application file for complete search history.

(56) References Cited

U.S. PATENT DOCUMENTS

| 2002/0002425 A1* | 1/2002 | Dossey | ............. G01F 1/44 |
| | | | 700/284 |
| 2004/0117070 A1* | 6/2004 | Barker | ............. A01G 25/092 |
| | | | 700/284 |

(Continued)

FOREIGN PATENT DOCUMENTS

EP 2509036 A1 10/2012

OTHER PUBLICATIONS

International Search Report and Written Opinion of the International Searching Authority completed Mar. 18, 2016, in International Patent Application No. PCT/US2015/055435, 15 pages.

*Primary Examiner* — Philip Wang
(74) *Attorney, Agent, or Firm* — Lowe Graham Jones PLLC (57) ABSTRACT

An irrigation control system having an irrigation controller with a unique identifier and configured to execute irrigation schedules, collect, store and forward watering metrics and determine global time, together with a power source, a global time receiver in communication with the microcontroller and configured to provide time from an outside source to the microcontroller and a transceiver in communication with the microcontroller configured to send messages including its unique identifier, predefined irrigation schedules, stored watering metrics and current global time. The system further includes a mobile computer having a microprocessor, a wireless transceiver configured to receive the messages from the irrigation controller transceiver and transmit instructions to the irrigation controller via a communication link and a memory coupled to the microprocessor and configured to store predefined irrigation schedules, and watering metrics. Methods for providing watering metrics and controlling an irrigation control system or value controller are also disclosed.

12 Claims, 9 Drawing Sheets

Related U.S. Application Data (60) Provisional application No. 62/063,838, filed on Oct. 14, 2014.

(56) References Cited

U.S. PATENT DOCUMENTS

| | | | |
|---|---|---|---|
| 2004/0236443 A1* | 11/2004 | Ware | G05B 19/0421 |
| | | | 700/90 |
| 2006/0027677 A1 | 2/2006 | Abts | |
| 2006/0181390 A1 | 8/2006 | Zigmond | |
| 2010/0179701 A1 | 7/2010 | Gilbert | |
| 2011/0093123 A1* | 4/2011 | Alexanian | A01G 25/16 |
| | | | 700/284 |
| 2011/0111700 A1 | 5/2011 | Hackett | |
| 2012/0254784 A1* | 10/2012 | Vander Griend | G06Q 50/00 |
| | | | 715/771 |
| 2013/0211717 A1* | 8/2013 | Abts | A01G 25/16 |
| | | | 701/485 |
| 2014/0039697 A1* | 2/2014 | Weiler | A01G 25/16 |
| | | | 700/284 |
| 2014/0129039 A1 | 5/2014 | Olive-Chahinian | |
| 2014/0222223 A1* | 8/2014 | Horton | G05D 7/0617 |
| | | | 700/284 |
| 2017/0202159 A9* | 7/2017 | Canyon | A01G 25/167 |

\* cited by examiner

| Date | ID | Lat | Lon | Water | Pmin | Pmax |
|---|---|---|---|---|---|---|
| 9/3 | 1A001510 | 46.0500° N | 118.3815° W | 4 hrs | 65 psi | 72 psi |
| 9/3 | 1A001510 | 46.0550° N | 118.3825° W | 4 hrs | 61 psi | 65 psi |
| 9/3 | 1A001511 | 46.0450° N | 118.3825° W | 4 hrs | 45 psi | 65 psi |
| 9/3 | 1A001511 | 46.0450° N | 118.3820° W | 4 hrs | 70 psi | 75 psi |
| 9/3 | 1A001512 | 46.0450° N | 118.3810° W | 4 hrs | 66 psi | 70 psi |
| 9/3 | 1A001512 | 46.0350° N | 118.3825° W | 4 hrs | 69 psi | 74 psi |

PROXIMITY PROGRAMMED, GLOBALLY SYNCHRONIZED IRRIGATION CONTROLLER AND SYSTEM

PRIORITY CLAIM

This application is a continuation of U.S. patent application Ser. No. 14/882,253 filed Oct. 13, 2015; which claims priority from U.S. Provisional Patent Application No. 62/063,838 filed Oct. 14, 2014, which applications are hereby incorporated by reference in their entirety as if fully set forth herein.

FIELD OF THE INVENTION

This invention relates to irrigation control systems and methods.

BACKGROUND OF THE INVENTION

Accurate and reliable delivery of water has, and continues to be, a critical function for irrigating crops, land application of waste water, and environmental control. Since water and electricity are limited resources, efficient methods of ensuring their delivery to the right place and at the right time continue to attract the attention of inventors and designers.

Irrigation controllers or timers have been available for decades, and are a cost-effective component for controlling an irrigation system. There are a number of commercially available, stand-alone irrigation timers that enable a user to preset an irrigation time schedule. These stand-alone irrigation timers execute a schedule, and provide enough power to actuate a latching solenoid thereby providing control for an irrigation valve according to the preset schedule. There are many instances where a plurality of stand-alone irrigation timers are used in a system, and where they are individually programmed to act in concert with one another to satisfy specific requirements of the system.

There are some problems with this approach however. For example, state-of-the-art systems rely on quartz crystal timing, which provides a reasonable level of accuracy for a short period of time; but over time, the clocks in each of these stand-alone irrigation timers slowly drift apart so that they no longer act in concert. This drift leads to unintended operation, and can cause many problems in an irrigation system.

In addition, each individual irrigation timer must be configured or programmed using either an on-board user interface or a dedicated programming fixture increasing the amount of time needed to maintain the system.

The advent of wireless technology promises to provide many opportunities to solve these challenges. For example, dedicated wireless networks managed by a central controller send specific instructions to valves scattered over a wide area. In these systems, the central controller provides a central clock, or system heartbeat, that ensures valves work in concert, even over a long period of time. In this case, the programming for all the valves is centralized at the controller or other remote device that communicates with the controller. In addition, data from the individual valves can be transferred back to the main controller via the wireless link. These advantages overcome many of the problems of the stand-alone timers.

While compelling in many applications, the dedicated wireless network does have its challenges. For example, because of its complexity, it is often higher in cost and energy usage. Additionally, in order for the wireless network to maintain its efficiency, regular messages must be sent by the central controller to keep the network synchronized to maintain its low power state. These regular messages place a power consumption burden upon the central controller making it a larger consumer of energy. If power is interrupted to the central controller, the individual wireless nodes are prone to consume more power, and can run short of energy reserves. To conserve power, wireless nodes are often configured to enter extended sleep periods to preserve their source of power. Bringing these wireless nodes that have entered extended sleep periods back on-line can introduce unacceptable amounts of system latency in some applications. In addition, sending regular synchronization messages adds to network congestion, which could become an increasing problem in the future as more and more wireless networks are deployed, as each system clamors for an increasingly crowded portion of the radio frequency spectrum.

In addition, there are situations where it is difficult to provide reliable wireless signal coverage over a diverse geographic area which is required to maintain synchronization of a wide area wireless system. In order to be successful, such a wide area system must be custom engineered to account for the spatial and geographical constraints. This custom engineering step can significantly increase the cost and complexity of a system limiting its availability for some users.

These and other challenges highlight the need for a new type of irrigation controller and system that provides a low cost, low power, synchronized irrigation control system that can be easily configured and operate using a minimal amount of the radio frequency spectrum. This is the subject of the present patent application.

SUMMARY OF THE INVENTION

An irrigation control system in accordance with a preferred version of the invention includes an irrigation controller and a mobile computer. The irrigation controller preferably includes a microcontroller, a power source, a global time receiver, a real-time clock and a transceiver. The microcontroller includes a unique identifier and is configured to receive and execute irrigation schedules, collect, store and forward watering metrics, and determine current global time. The global time receiver is in communication with the microcontroller and configured to provide a real-time value to the microcontroller. The transceiver is in communication with the microcontroller and is configured to send messages including its unique identifier and at least one of predefined irrigation schedules, stored watering metrics and current global time. The mobile computer includes a microprocessor, a wireless transceiver configured to receive the messages from the irrigation controller transceiver and transmit instructions to the irrigation controller via a communication link, and a memory coupled to the microprocessor and configured to store predefined irrigation schedules, and watering metrics.

In one version, the irrigation control system further includes an actuator configured to control a flow of water between a water source and an outlet and a valve driver circuit, in communication with the microcontroller, configured to drive the actuator according to at least one of the predefined irrigation schedules. The system may include a global positioning receiver connected to the microcontroller and configured to provide geospatial information to the microcontroller. A pressure sensor may be connected in fluid-sensing relation to the actuator.

In one version, the mobile computer is configured to compare predefined irrigation schedules received from the irrigation controller with predefined irrigation schedules stored in the mobile computer memory and if the predefined irrigation policies or schedules received from the irrigation controller are different than the predefined irrigation schedules stored in the mobile computer memory, transmit the predefined irrigation schedules stored in the mobile computer memory to the irrigation controller.

In another version, the mobile computer is configured to send a request to the irrigation controller to transfer watering metrics including the geospatial information received by the global positioning receiver and cumulative watering time recorded for each specific geographic location. In this version, the irrigation controller is configured to receive the request to provide watering metrics from the mobile computer, compile the requested watering metrics and transmit the watering metrics to the mobile computer via the established communication link.

In yet another version, the mobile computer is operable to associate an irrigation schedule targeted for a specific geospatial position and the irrigation controller is configured to execute the irrigation schedule targeted for a specific geospatial position when the geospatial information received by the global positioning receiver matches the targeted geospatial position.

An irrigation control system may also include a mobile computer and a valve controller. The mobile computer preferably includes a first processor which executes an irrigation scheduling application and a first wireless transceiver controlled by the first processor and adapted to communicate using a first wireless protocol. Here, the valve controller is located at a geospatial position and includes a second processor connected to a real-time clock and enabled to execute an irrigation schedule, a second wireless transceiver connected to the second processor and adapted to communicate using the first wireless protocol and a wireless receiver connected to the second processor and enabled to acquire real-time clock data from an outside source using a second wireless protocol. The second processor is configured to periodically adjust the real-time clock to match the real-time clock data. The first processor executes the irrigation scheduling application on the mobile computer so that the irrigation schedule is synchronized with the irrigation schedule in the valve controller using the first wireless protocol when the mobile device is located in a position that is proximate to the geospatial position of the valve controller.

In one version of this system, the wireless receiver is a geographic position receiver configured to provide a geospatial position value reflecting the current geospatial position of the valve controller to the second processor. The valve controller may further include a valve driver circuit that is connected in commanding relation to a valve that is operable to allow a flow of water when the valve is in an open position. The valve controller may also include a memory connected to the second processor, where the second processor is configured to measure an amount of time that the valve is in the open position and record in the memory the amount of time the valve was open and the geospatial position value. The amount of time and geospatial position values collected by the valve controller may be transferred to the mobile computer using the first wireless protocol when the mobile computer is proximate to the valve controller.

In another version of this system, the irrigation scheduling application may include an interface to associate a targeted irrigation schedule with a targeted geospatial location. The valve controller receives the targeted irrigation schedule including the targeted geospatial location using the first wireless protocol when the mobile computer is proximate to the valve controller and the second processor is operable to execute the targeted irrigation schedule when the geospatial position value is approximately equal to the targeted geospatial location.

The valve controller of this system may also include an accelerometer connected to the second processor. Here, the accelerometer is configured to record local motion of the valve controller as a time-ordered acceleration history and the second processor is configured to evaluate this time-ordered acceleration history to determine when to acquire an updated geospatial position value.

A method for providing watering metrics in an irrigation control system having an irrigation controller and a mobile computer may include the steps of sending a request from a wireless transceiver in communication with the mobile computer to a transceiver in communication with the irrigation controller for watering metrics associated with the irrigation controller, including the geospatial location values observed by a global positioning receiver and cumulative amount of watering time of distributing water at that specific geographic location, receiving the request for watering metrics from the mobile computer, compiling the requested watering metrics, transmitting the watering metrics to the mobile computer via the established communication link and displaying on a user interface of the mobile device the watering metrics in at least one of tabular or graphic format.

A method of controlling an irrigation system includes obtaining a mobile computer and an application configured to run on the mobile computer, obtaining a plurality of valve controllers, compiling an irrigation schedule for each of the valve controllers and synchronizing the valve schedule at each valve controller. Here, the mobile computer preferably has an integrated wireless transceiver configured to communicate using a first wireless protocol and each of the plurality of valve controllers has an integrated wireless transceiver that is configured to communicate using the first wireless protocol. The application running on the mobile computer compiles the irrigation schedule. The first wireless protocol is used to synchronize the valve schedule at each valve controller when the mobile computer is proximate to the valve controller. In another version, the method includes receiving at a wireless receiver integrated with each of the plurality of valve controller real-time clock information from an outside source. The valve schedule at each valve controller preferably utilizes the received real-time clock information.

Another method of controlling an irrigation system includes providing a mobile computer and an application configured to run on the mobile computer, providing a wireless transceiver integrated in the mobile computer and configured to communicate using a first wireless protocol, providing a plurality of valve controllers, providing each of the plurality of valve controllers with an integrated wireless transceiver that is configured to communicate using the first wireless protocol and providing each of the plurality of valve controllers with a wireless receiver that is configured to receive real-time clock information from an outside source. Here, the application is configured to compile an irrigation schedule for each of the valve controllers and each of the valve controllers is configured to synchronize the valve schedule using the first wireless protocol when the mobile device is proximate to the valve controller.

A method of commanding a valve controller having a real-time clock, a first wireless transceiver and a wireless receiver using an application enabled to run on a mobile computer having a second wireless transceiver includes specifying an irrigation schedule using the application, detecting the presence of the valve controller at the second wireless transceiver, forming a data connection between the first wireless transceiver and the second wireless transceiver, transferring the irrigation schedule from the mobile computer to the valve controller using the data connection if the irrigation schedule in the mobile computer differs from the irrigation schedule residing in the valve controller and running the irrigation schedule on the wireless valve controller based on timing provided by the real-time clock. This method may periodically receive and decode a clock signal from a common or outside source using the wireless receiver to synchronize the real-time clock. The method may also include indicating a presence of the valve controller by transmitting an advertising packet provided by the first wireless transceiver. In this case, detecting the presence of the valve controller at the second wireless transceiver preferably includes sensing the presence of the valve controller by receiving the advertising packet on the second wireless transceiver. In one embodiment, the method may abandon the data connection after the irrigation schedule has been transferred.

Another method of commanding a valve controller uses an application enabled to run on a mobile computer. This version includes providing a real-time clock having a real-time value, a first wireless transceiver and wireless receiver within the valve controller, providing a second wireless transceiver within the mobile computer, specifying an irrigation schedule using the application, periodically receiving and decoding a clock signal from a common or outside source using the wireless receiver to synchronize the real-time clock, indicating a presence of the valve controller by transmitting an advertising packet provided by the first wireless transceiver, sensing the presence of the valve controller by receiving the advertising packet on the second wireless transceiver, forming a data connection between the first wireless transceiver and the second wireless transceiver based on information contained in the advertising packet, transferring the irrigation schedule from the mobile computer to the valve controller using the data connection if the irrigation schedule in the mobile computer differs from the irrigation schedule residing in the valve controller, abandoning the data connection after the irrigation schedule has been transferred, and running the irrigation schedule on the wireless valve controller based on timing provided by the real-time clock. In further embodiments, the method includes providing a valve drive circuit and an actuator. Here, the running irrigation schedule commands the valve drive circuit to coerce the actuator into an open state when the irrigation schedule specifies a flow of water. Alternatively, the method may include providing a global position receiver operable to provide a geospatial location of the valve controller and compiling a history wherein the geospatial location and a real-time value is recorded when the actuator is put into the open state, and another real-time value is recorded when the actuator transitions out of the open state. In some situations, the compiled history may be transferred from the valve controller to the mobile computer using the data connection when it becomes available.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
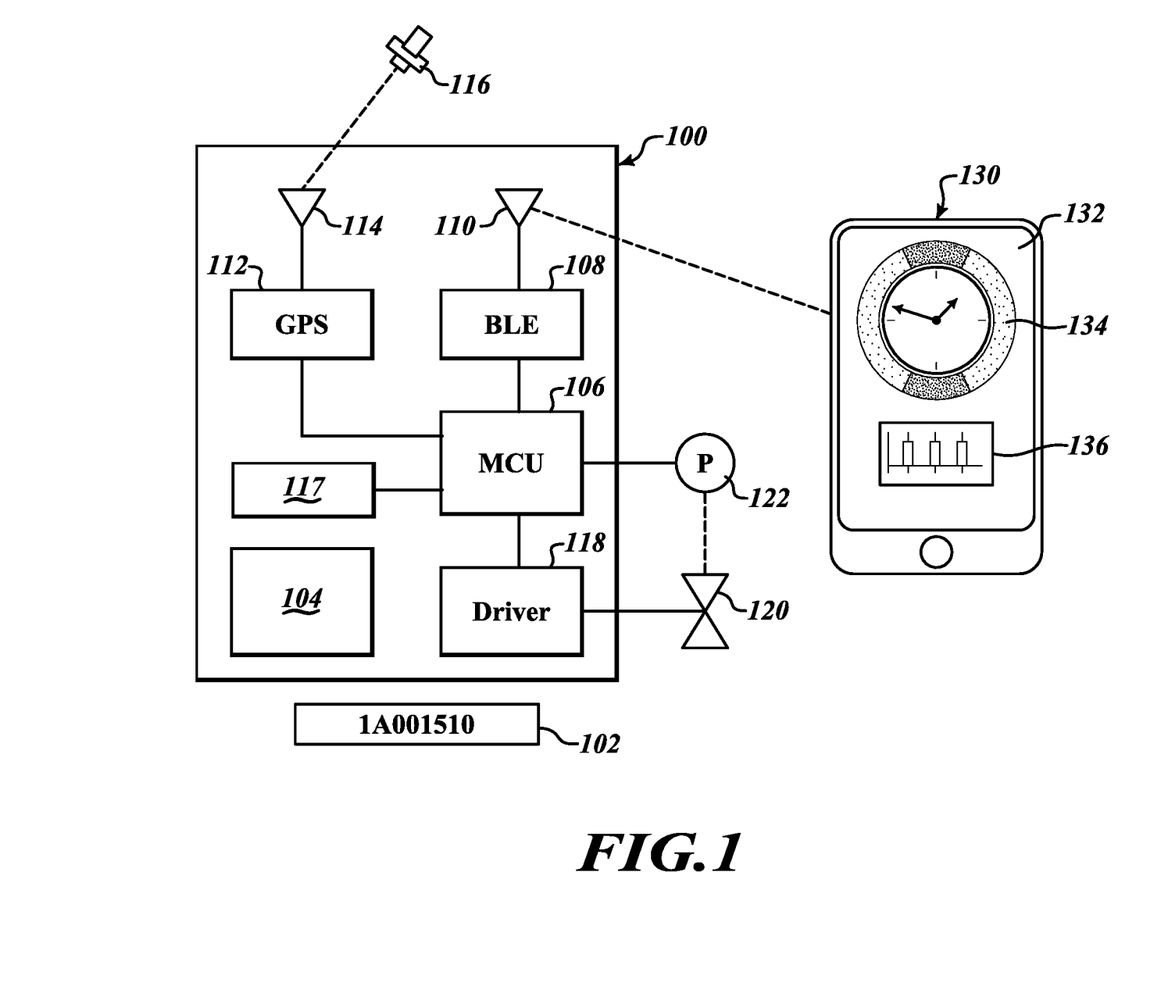
FIG. 1 is a block diagram of an exemplary irrigation controller.

Referring to FIG. 1, an irrigation controller 100 is illustrated in a simplified form with support components. The controller 100 is endowed with componentry to receive and execute irrigation policies and schedules, collect, store and forward watering metrics, and determine current global time and geospatial location. The controller 100 has a unique identification number or ID 102 that is assigned during manufacture, and provides a mechanism to uniquely target specific irrigation policies for the controller 100 and to tag data. The ID 102 can be both machine and user readable, and can include a bar code as well as human readable text and symbols.

A power source 104 is provided to energize the controller 100 during its operation. The power source 104 is advantageously included as an integral part of the controller 100 so that it does not need to be connected to existing power mains. This advantage enables the controller 100 to be truly portable, since there are no wires connecting to existing power mains. The power source 104 can be a conventional battery, but may also be an ultra-capacitor with suitable solar or other charging means.

A microcontroller 106 or processor running a set of predetermined instructions stored in an associated memory (not shown) and provides a mechanism for coordinating the function of various other components that are included in the controller 100. The microcontroller 106 also includes a crystal or resonator controlled real-time clock that is operable to maintain a reasonably accurate representation of both clock and calendar time which is useful for timing irrigation events.

A wireless transceiver 108 is connected to microcontroller 106 in data communication and power controlling relation. The transceiver 108 is connected to an antenna 110 that is configured to transduce signals between the transceiver 108 and the controller's 100 environment. The microcontroller 106 operates the transceiver 108 in a coordinated manner according to an agreed-upon protocol that enables it to interact with other devices that will be discussed in more detail below. One currently available protocol that is compatible with the operation of the controller 100 is Bluetooth Smart™ or Bluetooth Low Energy™. In one embodiment, the wireless transceiver 108 periodically transmits advertising packets that enable other devices that are scanning and are proximate to the transceiver 108 to connect and exchange information. In practical terms, the range of Bluetooth Low Energy™ is often limited to about 10 meters, so the wireless transceiver 108 can be considered proximate to a scanning device when it is within this range.

A receiver 112 is configured to provide time and optionally, geospatial location data to the microcontroller 106 derived from signals that are captured by the receiver antenna 114. These signals are provided by an outside source which can include either terrestrial stations or one or more satellites 116 that orbit the planet. Examples of the receiver 112 include but are not limited to a global position receiver, a WWVB receiver, or other equivalent known in the art.

The microcontroller 106 is configured to control the receiver 112 so that power provided by the power source 104 is conserved and that the real-time clock in the microcontroller 106 is synchronized with information received by the receiver 112 at regular intervals.

An accelerometer 117 is connected in data transmitting relation to the microcontroller 106, and is configured to provide real-time-motion data to the microcontroller 106. This real-time-motion data is utilized to sense local movement of the controller 100, and the data is used by the microcontroller 106 to determine when it is strategic to enable the receiver 112 to ascertain an updated geospatial location.

A valve driver 118 circuit is commanded by the microcontroller 106 to drive a bi-stable actuator 120 according to predefined irrigation policies or schedules. These policies or schedules can include but are not limited to absolute time schedules, relative time schedules, location-triggered scripts or event-triggered scripts.

The actuator 120 is configured to control a flow of water between a source (not shown) and outlet (not shown). The actuator 120 can be a solenoid, stepper motor, or other electro-mechanical device capable of converting electrical energy into mechanical motion. Yet further, the actuator 120 could be an interface relay that is connected to another device such as a pump.

In the embodiment shown, a pressure sensor 122 is connected in fluid-sensing relation to the actuator 120 and is optionally configured to measure a source pressure, an outlet pressure, or both a source and an outlet pressure. The driver 118 is configured to provide voltage and current signals to the microcontroller 106 that are used to determine its health and operational state of the actuator 120.

The memory (not shown) associated with the microcontroller 106 further stores the operational history of the controller over time, including the geographical position, the state of the valve driver, and the water pressure. As discussed further below, these operational history values can be transferred to another computer for later review and analysis.

A mobile computer 130 is shown located in proximate relation to the controller 100. In one version the mobile computer 130 is a specially configured, dedicated device for use in directing the controllers 100. In other versions, the mobile computer 130 may comprise a smartphone or other such device that can be programmed with an application to operate as a mobile computer as described here. The computer 130 is configured to operate or execute an application 132. The computer 130 has a wireless transceiver (not shown) that is configured by the application 132 to communicate in a compatible protocol with the transceiver 108 so that a communication link can be established between the controller 100 and the computer 130. In one version, the controller 100 and the computer 130 are each configured in a manner to implement at least a portion of the Bluetooth Low Energy™ (BLE) wireless data exchange standard to establish a communication link and exchange data between the computer 130 and the controller 100.

The application 132 is operable to transfer data to and from the transceiver 108. Further, the application 132 is configured to associate the ID 102 with the controller 100, and to forward irrigation policies and schedules developed by a user specifically for the controller 100 having the ID 102. Yet further, the application 132 is enabled to receive and store watering metrics that are associated with the ID 102.

The application 132 is configured to enable a user to create absolute time schedules, which are graphically represented by the numeral 134. The absolute time schedule 134 consists of a sequence of discrete times that specify the state of the valve driver 118 associated with the ID 102 over a period of time. For example, on the application 132 shown in FIG. 1, the valve driver 118 would be commanded to be in a relaxed or closed state between 12:30 to 5:00 and also between 6:30 to 11:00 and be commanded to be in an active or open state between 11:00 to 12:30 and also between 5:00 and 6:30. In one preferred version, these times and states are represented graphically though the use of a first color or shading of the circle 134 surrounding the clock that represents an active or open state and a second color or shading of the circle 134 representing a relaxed or closed state. The time schedule 134 includes an option to repeat the schedule on a daily, weekly, monthly, annually or other cyclical pattern. This time schedule 134 is communicated to the controller 100 on an as-needed basis when it is proximate or within communication range of the computer 130.

Further, the application 132 can be used to specify a relative time schedule that is triggered by an event detected by the controller 100. The application 132 provides a mechanism for selecting the type of event and the relative time offset and duration of desired irrigation relative to the event. The relative time schedule specifies when the state of the valve driver 118 is relaxed and active relative to the time of the event. An event includes placement of the actuator 120 on a valve hydrant (FIG. 2), arrival of water pressure over a threshold, and movement of the controller 100 to a specific geographic location.

The microcontroller 106 is configured within the controller 100 to sense specific events using data provided by the accelerometer 117, pressure sensor 122 and receiver 112. The controller 100 could also include other sensors not shown in FIG. 1; for example, a temperature or moisture sensor could be used as input to an irrigation policy to trigger a watering cycle when a threshold or criteria was satisfied.

The application 132 running on the computer 130 is also able to receive watering metrics in the form of data provided by the controller 100, and to display it as information as illustrated by the graph pointed to by the numeral 136.

Figure 2:
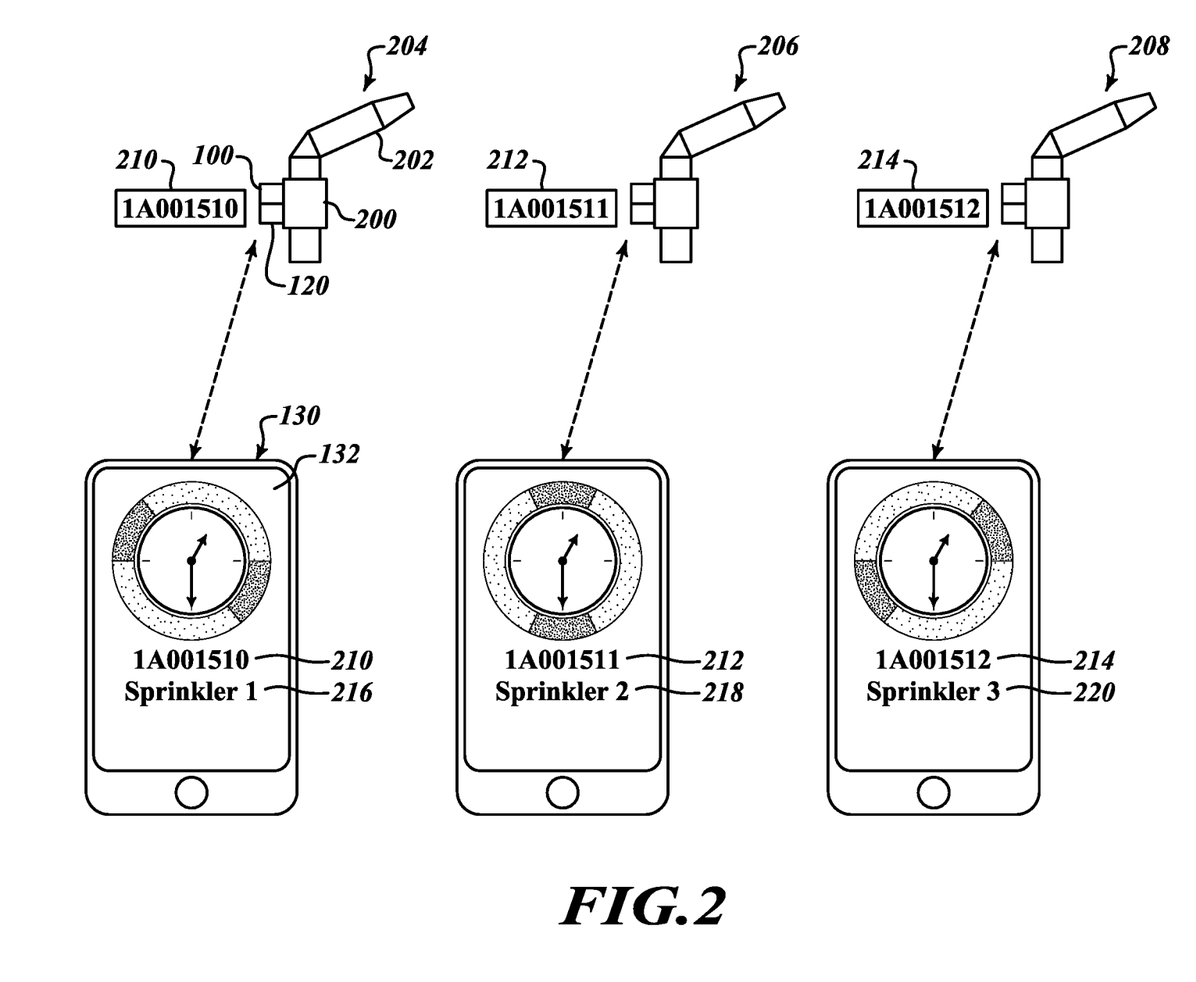
FIG. 2 is a diagram showing a computer transferring watering scripts and instructions to a plurality of watering sprinkler assemblies or valves.

Referring now to FIG. 2, the controller 100 is affixed to, or borne by, an irrigation valve 200 and a watering sprinkler 202 or other irrigating device. The sprinkler 202 is connected in fluid-flowing relation to the valve 200. The actuator 120 fluidly communicates with the valve 200 to cause it to open or to close in accordance with guidance provided by the controller 100.

An automated mobile water sprinkler assembly 204 or other fluid emission device is associated with a unique ID 210. From the figure, other water sprinkler assemblies 206 and 208 with unique IDs 212 and 214 are illustrated. Each of these individual IDs 212, 214, and 210 provide a mechanism wherein each controller 100 associated with the watering sprinkler assemblies 204, 206 and 208 can be addressed specifically by their respective IDs 210, 212 and 214.

The mobile computer 130 is configured to run the application 132 to configure and gather information from each of the watering sprinkler assemblies 204, 206 and 208 using their respective IDs 210, 212 and 214 in a manner that was introduced previously in this disclosure.

In a preferred embodiment, each controller 100 within the watering sprinkler assemblies 204, 206 and 208 is configured to transmit an advertising message, wherein its individual ID 210, 212 and 214 is periodically advertised via the transceiver 108 (FIG. 1). The application 132 running on the computer 130 is configured to store a record of individual IDs that have been configured by a user. The application 132 is further enabled to receive the advertising message and parse the respective ID 210, 212 and 214 from this advertising message. If there are no previously stored records of the parsed ID, then the application 132 is configured to enroll the ID 210, 212 and 214 of the respective controller 100 by storing a record of its ID 210, 212 and 214. Once enrolled, the application 132 provides a facility for providing a name referenced by the numerals 216, 218 or 220 and associating this user specified name with the respective ID 210, 212 or 214.

The application 132 running on the computer 130 further provides a facility for a user to define watering or irrigation policies and schedules to orchestrate the flow of water to each of the watering sprinklers 204, 206 and 208 within a system. The application 132 decomposes these policies and schedules to formulate specific scripts and instructions for each controller 100 according to its ID 210, 212 and 214. Further, the application 132 computes and stores a signature for the scripts and instructions for each of the IDs 210, 212 and 214. The application 132 can optionally include a system flow threshold, wherein the policies and schedules are formulated considering predefined hydraulic constraints of the system.

Each of the controllers 100 is configured to additionally advertise a representation or signature of its currently stored schedules or scripts and policies within its message. The application 132 running on the computer 130 compares this received signature from the controller 100 with a stored signature in the computer 130. If the received signature is not equal to the stored signature, then the application 132 instructs the computer 130 to transfer the schedules or scripts and instructions for the specific ID 216, 218 or 220 having the unequal signature to the respective controller 100 on the watering sprinkler assembly 204, 206 or 208. In this manner, schedules, scripts and instructions are transferred to the respective controller 100 only when an update is necessary. The application 132 is configured to keep the user apprised of the status of these transfers.

Finally, each of the controllers 100 is configured to record the time and current geospatial location whenever the respective script and instructions of the assembly 204, 206, or 208 cause a change in their respective irrigation state—which is defined as activating or de-activating the respective actuator 120 (FIG. 1). Additionally, a pressure reading from the sensor 122 (FIG. 1) is optionally recorded.

Figure 3:
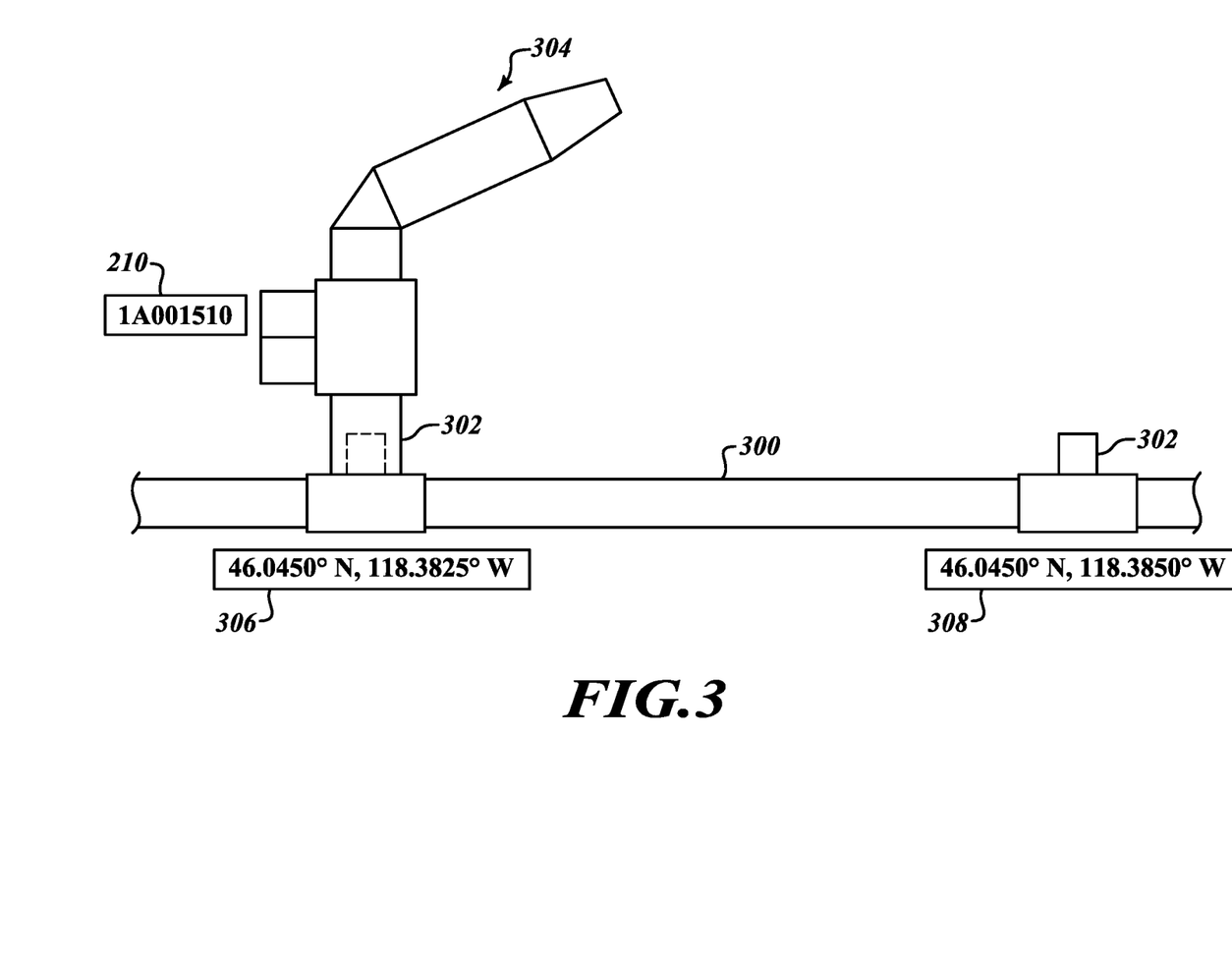
FIG. 3 is a diagram of a watering sprinkler assembly positioned on a hydrant.

Referring now to FIG. 3, a watering conduit or pipe 300 delivers a flow of water to a series of outlets or hydrants generally referred to by the numeral 302. The hydrants 302 are designed to engage with or couple to a watering sprinkler assembly 304. In this manner, a user is able to position the assembly 304 on any of the hydrants 302 in an irrigation system.

Each of the hydrants 302 is located at a specific geospatial location generally indicated by the latitude and longitudinal value referenced by the numerals 306 and 308.

Figure 4:
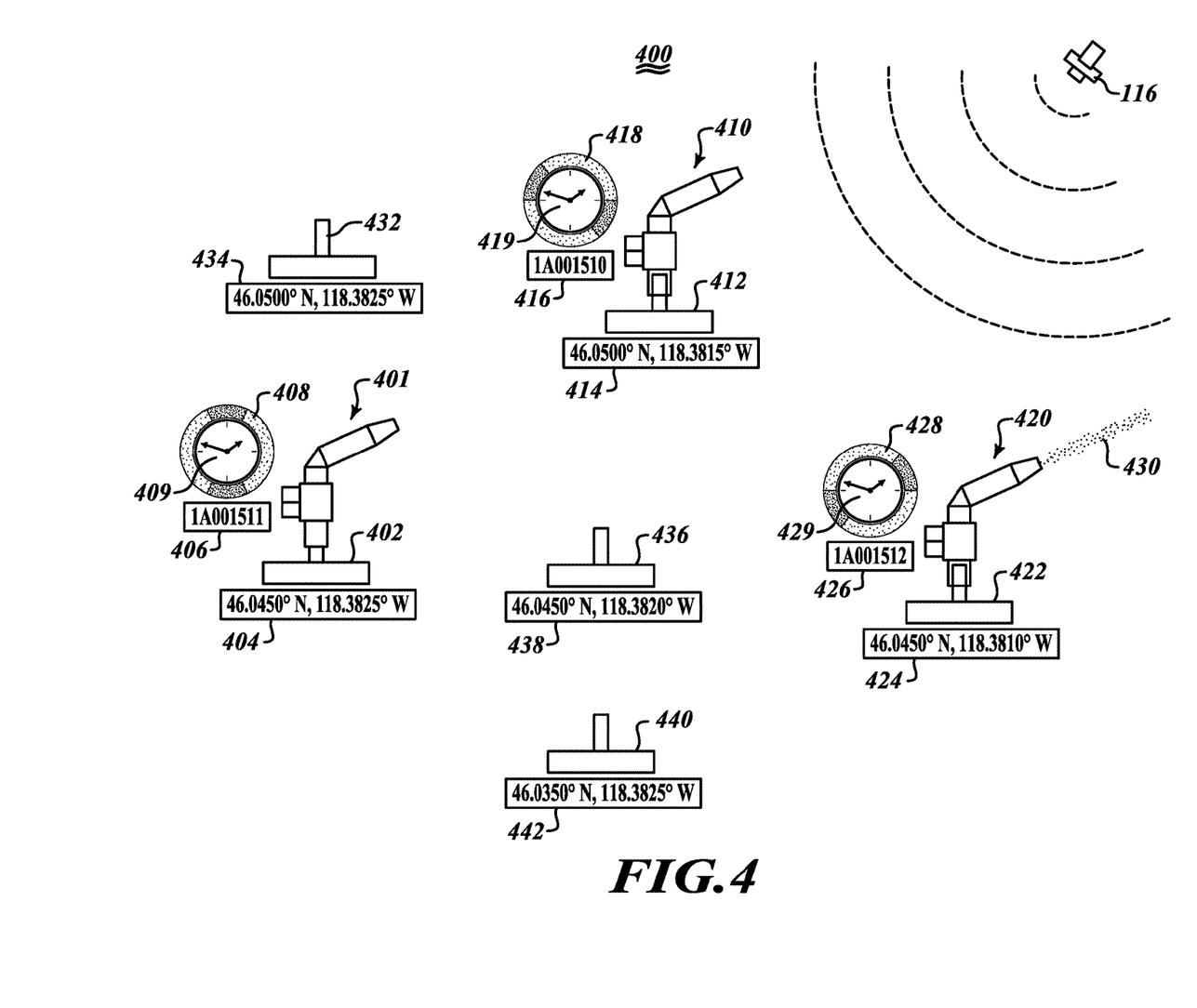
FIG. 4 is a diagram of an irrigation system with a plurality of watering sprinkler assemblies positioned in a first configuration in an initial arrangement.

Referring now to FIG. 4, an irrigation system 400 in a first configuration at a first time includes a watering sprinkler assembly 401 that is positioned in fluid-flowing relation upon a hydrant 402. The hydrant 402 is located at a geospatial position noted by the longitudinal and latitudinal values generally indicated by the numeral 404. The assembly 401 has a unique ID 406, and is configured to execute a watering script and instructions generally indicated by the numeral 408. The assembly 401 also includes a clock 409 that is periodically synchronized with a global time reference, which in a preferred embodiment is provided by the satellite 116.

Further, a watering sprinkler assembly 410 is positioned in fluid-flowing relation upon a hydrant 412. The hydrant 412 is located at a geospatial position noted by the longitudinal and latitudinal values generally indicated by the numeral 414. The assembly 410 has a unique ID 416, and is configured to execute a watering schedule or script and instructions generally indicated by the numeral 418. The assembly 410 also includes a clock 419 that is periodically synchronized with a global time reference, which in a preferred embodiment is provided by the satellite 116.

Yet further, a watering sprinkler assembly 420 is positioned in fluid-flowing relation upon a hydrant 422. The hydrant 422 is located at a geospatial position noted by the longitudinal and latitudinal values generally indicated by the numeral 424. The assembly 420 has a unique ID 426, and is configured to execute a watering script and instructions generally indicated by the numeral 428. The assembly 420 also includes a clock 429 that is periodically synchronized with a global time reference, which in a preferred embodiment is provided by the satellite 116.

The irrigation system 400 also includes a hydrant 436 located at a geospatial position 438 and another hydrant 440 located at a geospatial position 442.

The assembly 420 is shown in an irrigating state wherein a stream of water 430 is expelled and delivered to a surrounding area in accordance to its script and instructions 428 in reference to its clock 429.

Figure 5:
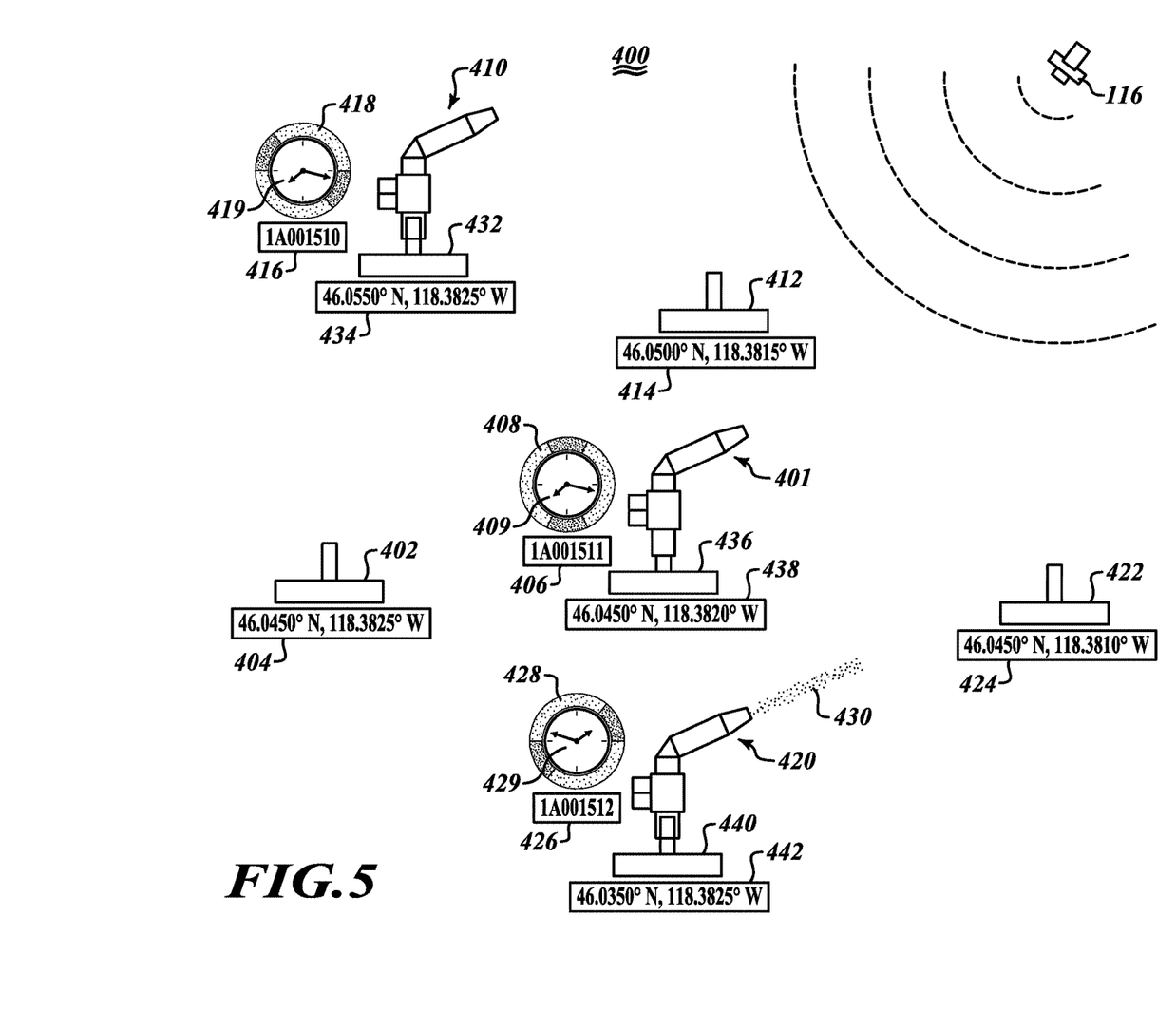
FIG. 5 is a diagram of an irrigation system with a plurality of watering sprinkler assemblies positioned in a second configuration at a second time.

Referring now to FIGS. 2, 4 and 5, an alternative embodiment of the irrigation system 400 is realized by configuring the controller 100 within each of the watering assemblies 401, 410, and 420 to use its respective geospatial location to modify its watering script in response to programmed watering policies that were provided by, and transferred from the computer 130.

In yet another alternative embodiment, the application 132 that is running on the computer 130 could be configured to modify the watering script intended for the respective watering assembly 401, 410 and 420 based on each individual current geospatial location. In this manner, and by way of example, the application 132 could be configured to read the geospatial location of the watering assemblies 401, 410, and 420 and program each so that they are sequenced in an order that follows their geospatial location.

Referring now to FIG. 5, the irrigation system 400 is shown in a second configuration at a second point in time. Now, a user has moved the watering sprinkler assembly 410 to the hydrant generally designated by the numeral 432 that is located at a geospatial position generally indicated by the numeral 434. Further, a user has moved the watering sprinkler assembly 401 to the hydrant generally designated by the numeral 436. Finally, a user has moved the watering sprinkler assembly 420 to the hydrant generally designated by the numeral 440. Here, the assembly 420 is shown in an irrigating state wherein the stream of water 430 is expelled to a surrounding area in accordance to its script and instructions 428 in reference to its clock 429.

Figure 6:
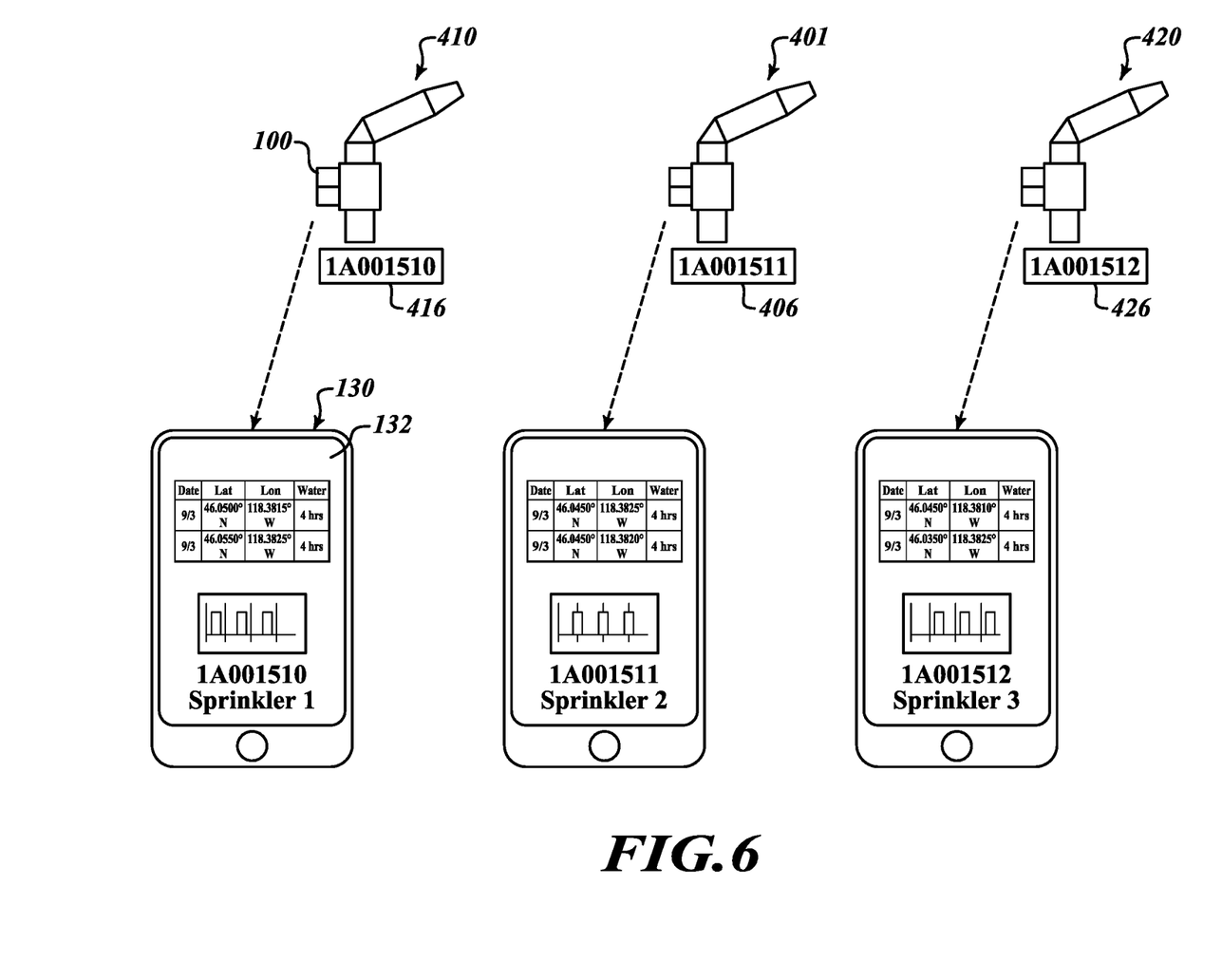
FIG. 6 is a diagram showing a computer receiving watering history and sensor logs from a plurality of watering sprinkler assemblies.

Referring now to FIG. 6, the controller 100 within the watering sprinkler assembly 410 is further configured to append to its advertising message flag signaling the presence of data records or watering logs available for transfer. The application 132 of the computer 130 is configured to query for the presence of this flag; and when present, will assemble a data log request which will be transmitted to the specific controller 100. The controller 100 is configured to respond to this request by transmitting the data records and watering logs via the transceiver 108 (FIG. 1). These data records and watering logs will be stored by the application 132 into a memory on the computer 130, and will be associated with other data associated with the ID generally referenced by the numeral 416. The application 132 is configured to make this information available to a user in a tabular or graphical format. The controller 100 erases the data records and watering logs stored locally at the controller 100 when it confirms that they have been transmitted to the computer 130.

In a similar manner, the assemblies 401 and 420 are configured to transfer their respective data records and watering logs to the computer 130.

Figure 7:
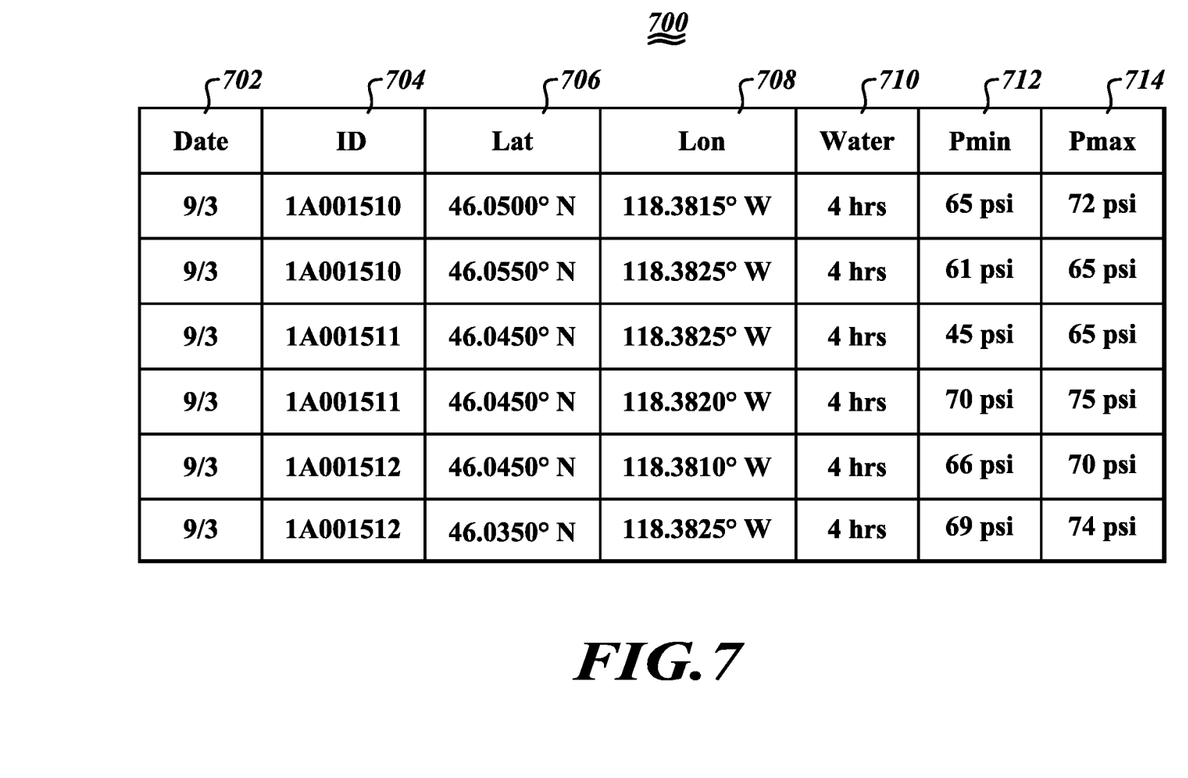
FIG. 7 is a table of example data records and watering logs collected by irrigation controllers and transferred to a computer.

Referring now to FIGS. 6 and 7, a table 700 lists data records and watering logs transferred from the watering sprinkler assemblies 401, 410 and 420. The table 700 includes a date and/or time value 702, an ID value 704, geospatial location values 706 and 708 (which may also include a more familiar name, such as the sprinkler ID shown in FIG. 2), a cumulative amount of time that the watering sprinkler assembly 710 watered at a specific geographic location, and a record of the minimum and maximum pressure 712 and 714 recorded during that watering at that specific geographic location.

Figure 8:
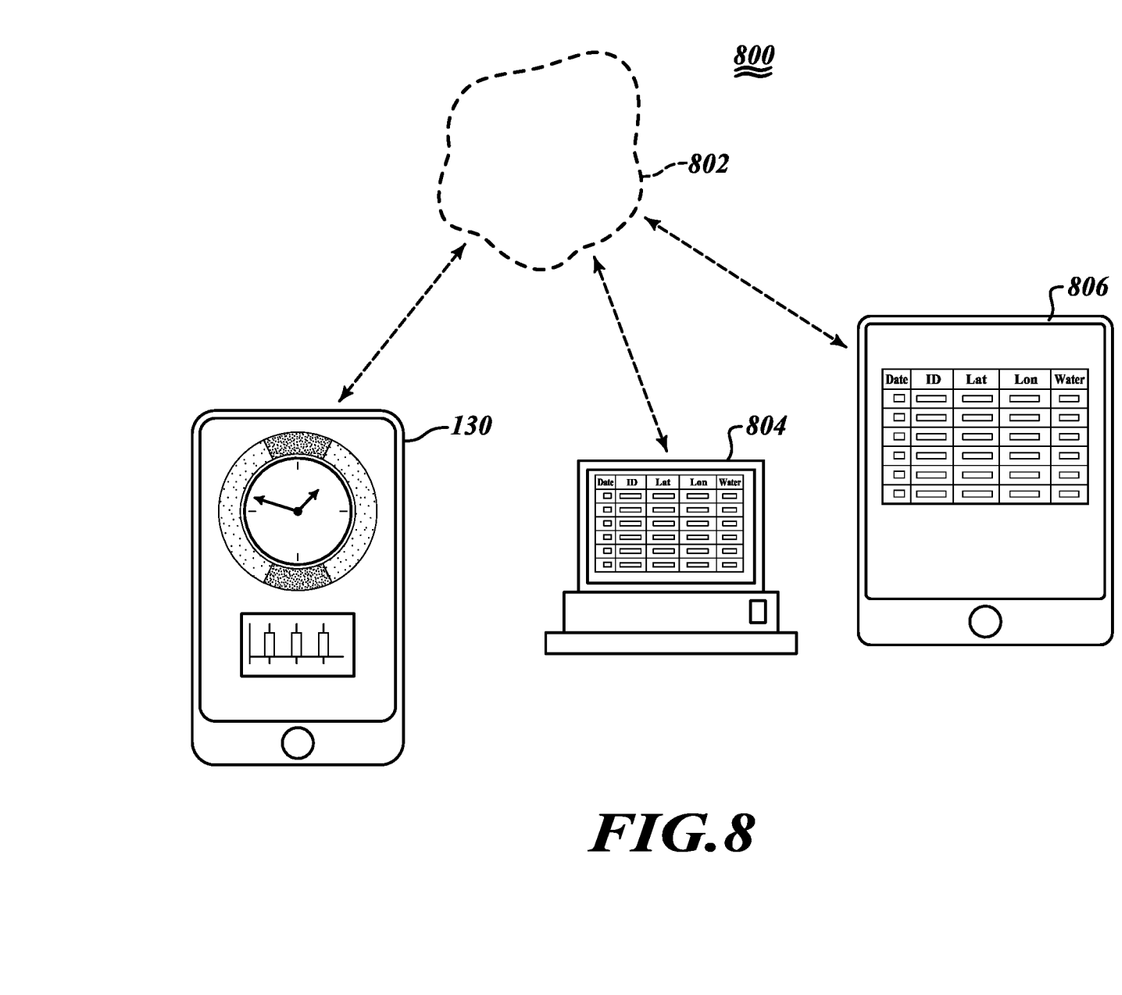
FIG. 8 is a diagram showing data sharing from an irrigation system.

Now referring to FIG. 8, a data network 800 comprises the computer 130 that is configured to be in data communication with a shared data storage cloud 802 to share irrigation system data. Other devices 804 and 806 are configured to receive copies of this system data. In one example, the shared data storage cloud 802 comprises a remote server having a memory and interface configured to communicate with the computer 130. Preferably under control of the application 132, irrigation data such as that indicated on the table 700 can be transferred to and stored on the memory associated with the cloud storage device. In another example, the cloud 802 may represent a communications network enabling the computer 130 to transfer data and instructions to another computer such as computer 804 (which is illustrated as a desktop computer) or computer 806 (which is illustrated as a mobile computer, such as a smartphone or tablet). In either case, data and programming instructions may be passed in both directions, to and from the computer 130. Most preferably, the computer 804 is configured to run a version of the application as stored on the remote computer 130, enabling a user to operate computer 804 to create valve control timing instructions to be sent to the remote computer 130 for later delivery to the controllers 100.

Figure 9:
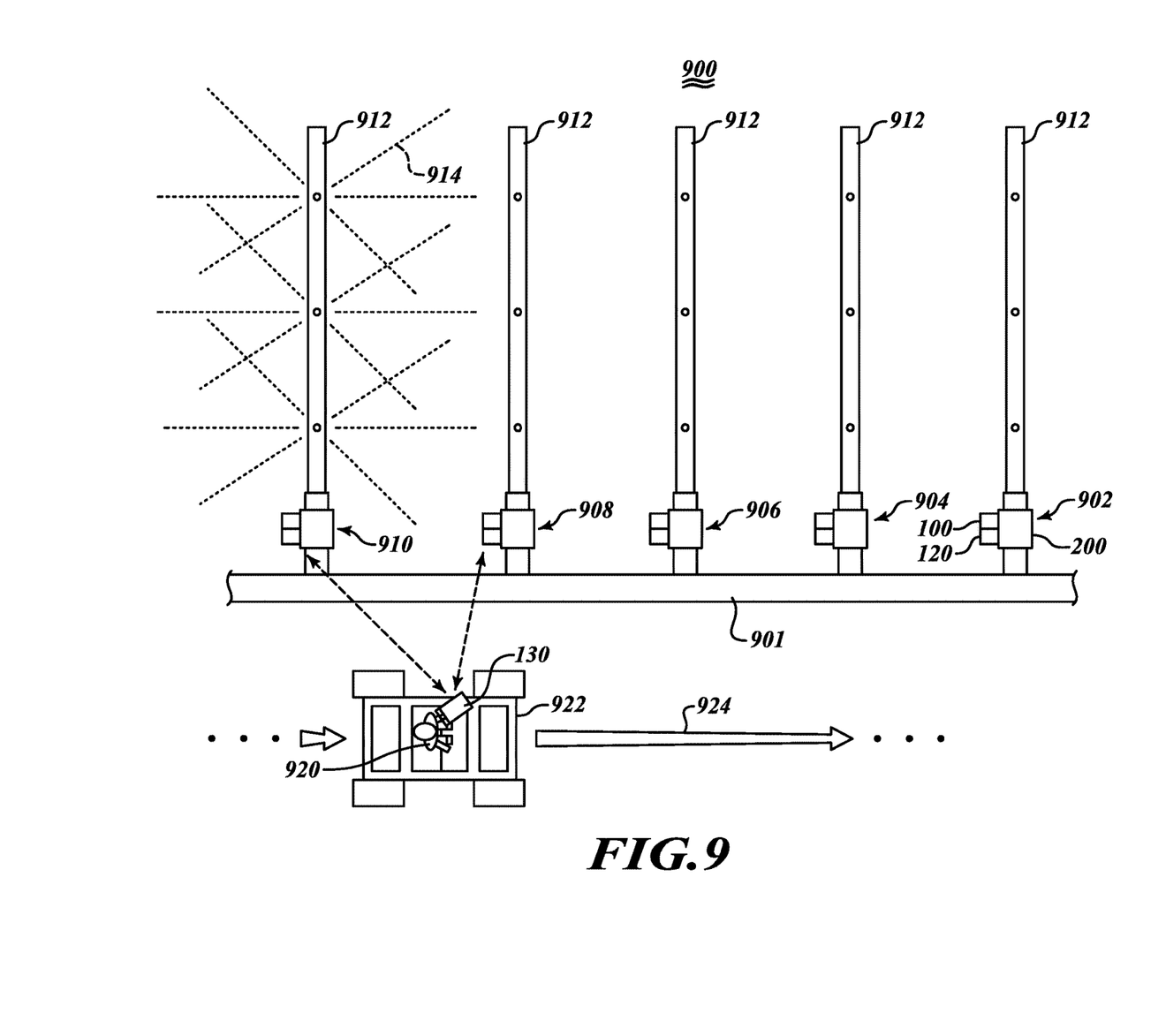
FIG. 9 is a diagram of an irrigation system operated by a plurality of controlled valves being configured by a mobile computer traveling along a path that is proximate to the valves.

Referring now to FIG. 9, an alternative irrigation system 900 is shown. A plurality of controlled valves 902, 904, 906, 908 and 910 are fluidly connected to a pipeline delivery network or watering main 901. Each of the valves 902, 904, 906, 908 and 910 include the controller 100, actuator 120 and valve 200, and are configured in the same manner as described earlier. Each of the controlled valves 902, 904, 906, 908 and 910 have a unique ID (not shown) and each valve is connected to an elongated fluid conduit that is punctuated by a series of watering emitters or sprinkling outlets generally referenced by the numeral 912. The conduit 912 that is connected to the valve 910 is shown actively irrigating as indicated by the numeral 914.

In one version of the invention, the advertising range for the valve controllers is limited, such that each of the controllers 100 dispersed over the system may not be in continuous communication with the computer 130. In one implementation of such a version, the computer may be brought within advertising range in order to communicate with and control the controllers 100. With reference to FIG. 9, a user 920 is shown driving a mobile vehicle or cart 922 along a path generally indicated by the numeral 924. The user 920 is holding the computer 130 that is running the application 132 that has been described earlier in this specification. As the user drives the cart and comes within advertising range of each valve 902, 904, 906, 908 and 910, the respective controller 100 and the application 132 are each configured to transfer scripts and watering schedules as well as data records and watering logs in a manner described earlier in this specification. It should be understood, then, that individual scripts and watering schedules are delivered from the computer 130 to each respective valve 902, 904, 906, 908 and 910 as the user 920 drives the cart 922 along a path 924. It should further be understood that data records and watering logs from each of the valves 902, 904, 906, 908 are delivered to the computer 130 as the user 920 drives the cart 922 along a path 924. It should be understood that the cart 922, could also be an autonomous vehicle, or a drone, without departing from the scope of this invention.

Additionally, a source of water for the valves 902, 904, 906, 908 and 910 can be provided by a center pivot or linear water span, with a sprinkler tied directly to each of the valves 902, 904, 906, 908 and 910. In this configuration, individual scripts and watering polices are delivered from the computer 130. In this configuration, watering policies created by the computer 130 are crafted to respond to a geospatial position measured by each of the valves 902, 904, 906, 908 and 910. In this manner, the valves 902, 904, 906, 908 and 910 are configured to modulate a flow of water to a sprinkler as a function of a measured geospatial position.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims.

The invention claimed is:

1. An irrigation control system, comprising:
 an irrigation controller having
  a microcontroller having a unique identifier and configured to receive, modify and execute irrigation schedules, collect, store and forward watering metrics, and determine current global time;
  a power source;

a global time receiver, in communication with the microcontroller, configured to provide time to the microcontroller;

a global positioning receiver connected to the microcontroller and configured to provide geospatial information to the microcontroller;

a transceiver in communication with the microcontroller, the transceiver configured to send messages including at least one of predefined irrigation schedules, stored watering metrics, wherein the irrigation controller is configured to modify and execute an irrigation schedule targeted for a specific geospatial position when the geospatial information received by the global positioning receiver matches the targeted geospatial position.

2. The irrigation control system of claim 1, further comprising:

an actuator configured to control a flow of water between a water source and an outlet; and a valve driver circuit, in communication with the microcontroller, configured to drive the actuator according to the irrigation schedules.

3. The irrigation control system of claim 2, further comprising a pressure sensor connected in fluid-sensing relation to the actuator.

4. The irrigation control system of claim 1, further comprising a mobile computer having a microprocessor;

a wireless transceiver configured to receive the messages from the irrigation controller transceiver and transmit instructions including at least one of predefined irrigation schedules or stored watering metrics to the irrigation controller via a communication link; and a memory coupled to the microprocessor and configured to store predefined irrigation schedules and watering metrics.

5. The irrigation control system of claim 4, wherein the mobile computer is configured to:

compare predefined irrigation schedules in the irrigation controller with predefined irrigation schedules stored in the mobile computer memory; and if the predefined schedules in the irrigation controller are different than the predefined irrigation schedules stored in the mobile computer memory, transmit the predefined irrigation schedules stored in the mobile computer memory to the irrigation controller.

6. The irrigation control system of claim 5, wherein the mobile computer is configured to send a request to the irrigation controller to transfer watering metrics including the geospatial information received by the global positioning receiver and cumulative watering time recorded for each specific geographic location; and the irrigation controller is configured to:

receive the request to provide watering metrics from the mobile computer;

compile the requested watering metrics; and transmit the watering metrics to the mobile computer via the established communication link.

7. The irrigation control system of claim 6, wherein the mobile computer is operable to associate an irrigation schedule targeted for a specific geospatial position.

8. The irrigation control system of claim 5, wherein the irrigation controller is in direct communication with the mobile computer to send and receive messages and instructions, and does not require a separate central server to relay information.

9. A method of commanding an irrigation controller having a microcontroller enabling a control application, a memory storage, a power source, a global positioning receiver connected to the microcontroller, and a transceiver, comprising:

specifying a predetermined geospatial position;

maintaining in the memory at least one irrigation schedule associated with the predetermined geospatial position;

detecting current geospatial information for the irrigation controller using the global position receiver;

providing the current geospatial information for the irrigation controller to the microcontroller;

using the application, retrieving the irrigation schedule maintained in the memory storage associated with the predetermined geospatial position; and executing the irrigation schedule associated with the predetermined geospatial position.

10. The method of commanding the irrigation controller of claim 9, wherein the irrigation controller has a global time receiver, further comprising:

maintaining in the memory at least one irrigation schedule associated with a predetermined time for execution of the irrigation schedule;

detecting the current global time using the global time receiver;

providing the current global time to the microcontroller;

using the application, retrieving the irrigation schedule maintained in the memory storage associated with the predetermined time for execution of the irrigation schedule; and executing the irrigation schedule associated with the predetermined global time.

11. The method of commanding the irrigation controller of claim 9 using a mobile computer having a microprocessor, a wireless transceiver in communication with the irrigation controller transceiver, and a memory configured to store a predefined irrigation schedules, comprising:

transferring a second irrigation schedule from the mobile computer to the irrigation controller;

comparing the second irrigation schedule to the irrigation schedule associated with the predetermined geospatial position; and if the second irrigation schedule is different than the irrigation schedule associated with the predetermined geospatial position, modifying the irrigation schedule associated with the predetermined geospatial position to be consistent with the second irrigation schedule.

12. The method of commanding the irrigation controller of claim 11, wherein the second irrigation schedule overwrites the irrigation schedule associated with the predetermined geospatial position rather than being compared to or modifying it.

* * * * *